United States Patent
Fourquin et al.

(10) Patent No.: US 7,810,247 B2
(45) Date of Patent: Oct. 12, 2010

(54) METHOD FOR ENTERING COMMANDS AND/OR CHARACTERS FOR A PORTABLE COMMUNICATION DEVICE EQUIPPED WITH A TILT SENSOR

(75) Inventors: Xavier Fourquin, Sevres (FR); Nicolas Balley, Paris (FR)

(73) Assignee: IPG Electronics 504 Limited, St. Peter Port, Guernsey (GB)

( * ) Notice: Subject to any disclaimer, the term of this patent is extended or adjusted under 35 U.S.C. 154(b) by 0 days.

(21) Appl. No.: 12/504,936

(22) Filed: Jul. 17, 2009

(65) Prior Publication Data

US 2009/0278820 A1 Nov. 12, 2009

Related U.S. Application Data

(63) Continuation of application No. 11/649,885, filed on Jan. 5, 2007, now Pat. No. 7,562,459.

(30) Foreign Application Priority Data

Jan. 6, 2006 (EP) .................................. 06100130

(51) Int. Cl.
*G01C 9/06* (2006.01)
(52) U.S. Cl. ........................ 33/366.11; 702/85; 702/150
(58) Field of Classification Search . 33/366.11–366.27; 340/689; 702/85, 87, 94, 150, 151, 154
See application file for complete search history.

(56) References Cited

U.S. PATENT DOCUMENTS

| 5,847,647 | A * | 12/1998 | Devine ........................ 340/689 |
| 6,347,290 | B1 * | 2/2002 | Bartlett ........................ 702/150 |
| 6,369,794 | B1 * | 4/2002 | Sakurai et al. ............... 345/156 |
| 6,567,101 | B1 * | 5/2003 | Thomas ........................ 345/649 |
| 6,573,883 | B1 * | 6/2003 | Bartlett ........................ 345/156 |
| 6,722,049 | B2 * | 4/2004 | Singer et al. .................. 33/391 |
| 6,826,844 | B2 * | 12/2004 | Endo et al. ............... 33/366.24 |
| 7,562,459 | B2 * | 7/2009 | Fourquin et al. ......... 33/366.11 |
| 2004/0083616 | A1 * | 5/2004 | Hamar ..................... 33/366.11 |
| 2004/0227742 | A1 | 11/2004 | Fateh et al. | |
| 2005/0166410 | A1 * | 8/2005 | Richter et al. ............ 33/366.12 |

(Continued)

FOREIGN PATENT DOCUMENTS

EP 1 591 873 11/2005

(Continued)

*Primary Examiner*—G. Bradley Bennett
(74) *Attorney, Agent, or Firm*—Volpe and Koenig, P.C.

(57) ABSTRACT

Portable communication devices are disclosed. The devices each include a motion detector configured to measure a movement of the device relative to a neutral position of the device, an indicating unit configured to provide an indication that a current position of the device is to be set as the neutral position of the device, and a control unit configured to set the current position as the neutral position responsive to the indicating unit providing the indication. In an embodiment of the portable communication device, the control unit is further configured to associate the measured movement of the device relative to the neutral position of the device with an associated command and execute the associated command. In another embodiment of the portable communication device, the control unit is further configured to associate the measured movement of the device with an associated character and enter the associated character as an input character.

8 Claims, 1 Drawing Sheet

U.S. PATENT DOCUMENTS

| | | | |
|---|---|---|---|
| 2005/0197145 A1* | 9/2005 | Chae et al. | 455/517 |
| 2006/0146009 A1* | 7/2006 | Syrbe et al. | 345/156 |
| 2006/0161379 A1* | 7/2006 | Ellenby et al. | 702/150 |
| 2007/0180719 A1* | 8/2007 | Donnelly et al. | 33/366.11 |

FOREIGN PATENT DOCUMENTS

| | | |
|---|---|---|
| GB | 2 347 593 | 9/2000 |
| JP | 2002-171316 | 6/2002 |
| JP | 2002-207703 | 7/2002 |
| WO | 01/56256 | 8/2001 |
| WO | 03/077087 | 9/2003 |
| WO | 2004/082248 | 9/2004 |
| WO | 2006/000639 | 1/2006 |

\* cited by examiner

METHOD FOR ENTERING COMMANDS AND/OR CHARACTERS FOR A PORTABLE COMMUNICATION DEVICE EQUIPPED WITH A TILT SENSOR

This application is a continuation of U.S. patent application Ser. No. 11/649,885, filed Jan. 5, 2007, which claims priority from European Patent Application No. 06100130.1, filed on Jan. 6, 2006, which are incorporated by reference as if fully set forth.

FIELD OF INVENTION

The present invention relates to portable communication devices which are provided with an input device using detection of vibration/inclination of the communication device for entering information into the portable device. Portable communication devices which are concerned are all types of handheld communication devices such as PDAs and mobile phones.

BACKGROUND

The present invention relates to portable communication devices which are provided with an input device using detection of vibration/inclination of the communication device for entering information into the portable device. Portable communication devices which are concerned are all type of handheld communication devices such as PDAs and mobile phones.

A great number of entering devices are known for these types of portable devices, such as keypads, touch screens used either with the finger, or with a specific stylus, 2D or 4D navigating means in form of one or more navigating keys, or even acoustic means for voice recognition. More recently, new entering devices based on the detection of movement of the portable device through detection of inclination of the portable device with respect to at least one axis, have been developed. These new entering devices include a tilt sensor among at least one of gyroscope, accelerometer, multi-axis gyroscope and multi-axis accelerometer.

Document US2005/0197145 discloses a mobile phone which allows a user to input a phone number in view of taking a call without any manipulation of the keypad, thanks to the use of vibration/inclination detection means. Each number, from 0-9, composing the phone number is deduced from the numbers of detected movements and inclinations according to a predetermined rule.

Document EP 1 591 873 discloses a method and apparatus for entering information into a portable electronic device with the help of a tilt sensor. According to this document, a tilt sensor is used to determine whether a change of inertia around at least one axis corresponds to a tapping of the input device, to identify a contacted region of the input device, and to perform at least one function based on the identity of the contacted region of the input device. The related functions are chosen among controlling a volume, scrolling through a menu or a list of items, selecting an item, and displaying characters or symbols. For entering a number or a character, the user needs to tap consecutively in several regions of the input device. The sequence of identified contacted zones will determine the corresponding character.

At last, a new mobile phone including a 3D accelerometer has come on the market. The accelerometer calculates and ascertains movement of the mobile phone in three dimensional space, and carries out commands according to those calculations. For example, a user will move the phone in the air in a gesture which draws number "3." This motion is calculated by the accelerometer and figure "3" is displayed on the screen of the mobile.

Although this new way of entering commands, by motions of the mobile phone according to predetermined gestures, is very trendy, one possible drawback for the user will be to learn the correct gesture he will have to make for a given function, and also how he should handle his mobile phone when he starts any motion of the mobile phone. One reason is that the neutral position of the accelerometer, i.e. the reference position from which the calculations are made, is calibrated and fixed at the time of manufacturing the mobile phone, depending on the location and orientation of the accelerometer inside the housing. This means that, each time the user will have to use the accelerometer's functionalities, for instance for navigation purposes, he will have to first correctly position his mobile phone in order to be in correspondence with the neutral position of the accelerometer. For instance, if the neutral position of the accelerometer is defined for vertical position of the mobile phone, the user will have to start any gesture with handling first the mobile phone vertically.

SUMMARY

The aim of the invention is to remedy the above drawback by proposing a solution enabling a user to define at any time the neutral position of the accelerometer. To this aim, an object of the present invention is to provide a method for entering commands and/or characters for a portable communication device equipped with an input device comprising a tilt sensor, said method comprising the steps of: determining a motion of said portable communication device through measurements of said tilt sensor calculated in reference to a neutral position of said tilt sensor; and deducing from said motion an associated command and/or character, said method being characterized in that it further comprises a preliminary calibration step triggered by a user of said portable communication device, including defining said neutral position as being the current position of the sensor at the time of triggering said calibration step.

BRIEF DESCRIPTION OF THE DRAWINGS

Features and advantages of the invention will become apparent from the following description of the invention with reference the drawings in which.

DETAILED DESCRIPTION OF THE PREFERRED EMBODIMENTS

Figure 1:
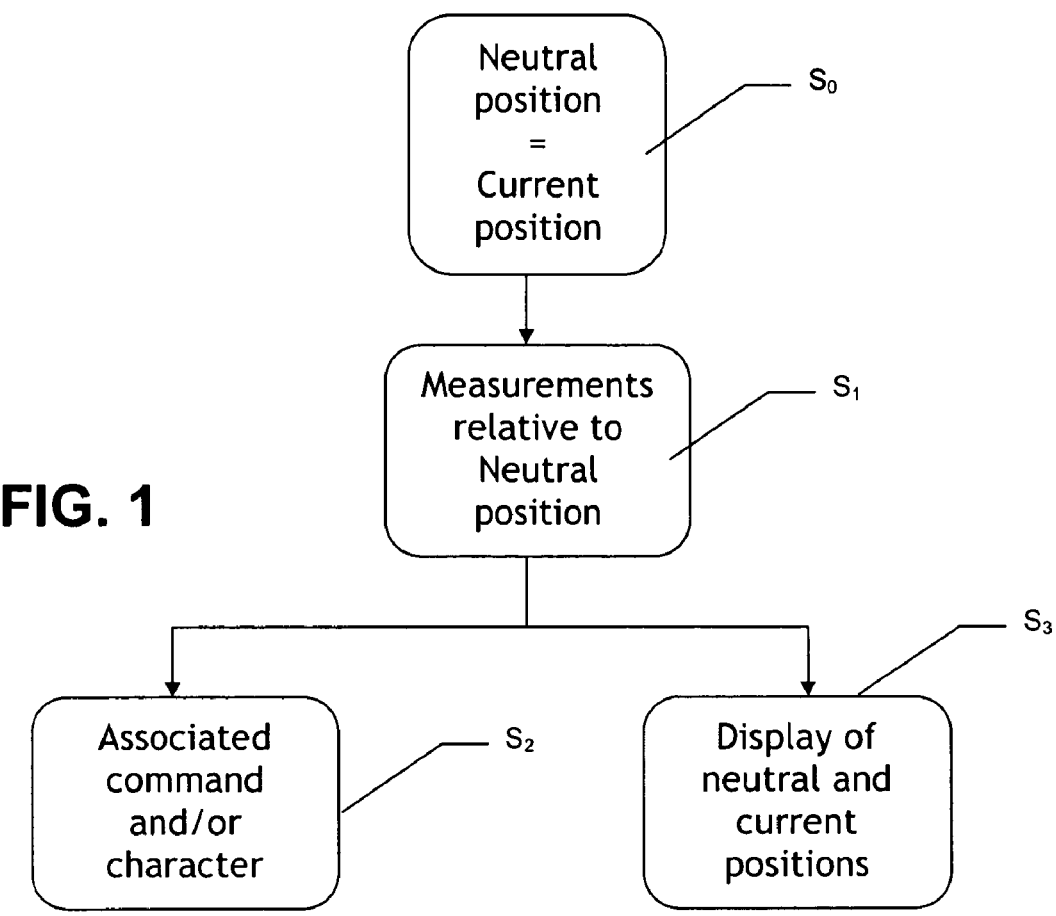
FIG. 1 is a flowchart showing the successive steps of the method according to the invention.
Figure 2:
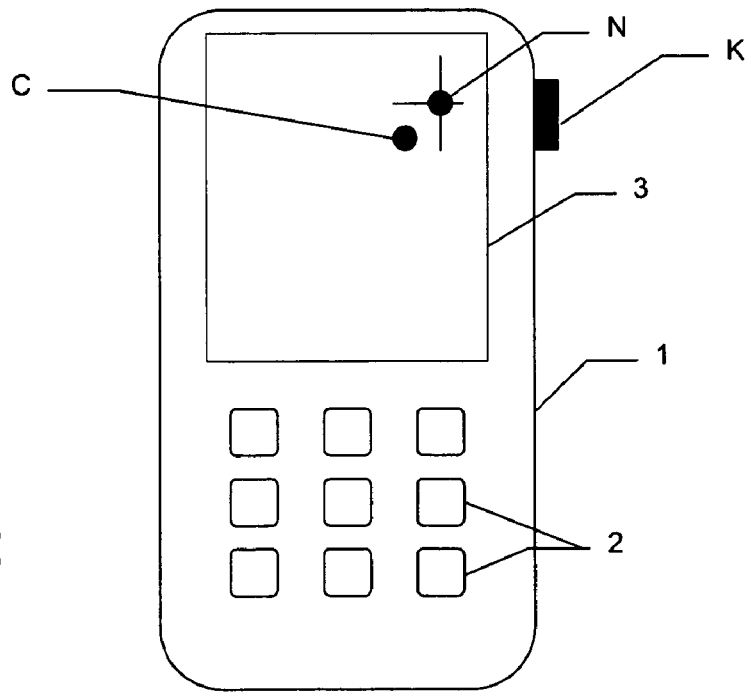
FIG. 2 shows schematically a portable communication device according to a possible embodiment of the invention.

In relation with FIG. 2, a portable communication device 1 in which a method according to the invention may be implemented may comprise a classical entering device, such as a keypad including several keys 2, and a screen 3 for displaying different items such as menus through which a user can navigate, or data relating to the status of the device (battery level, cellular network coverage in case of a mobile phone, date . . . ), or characters and/or numbers which are entered by the user, for instance for taking a call or sending a message. Portable communication device 1 also includes an input device (not shown) comprising a tilt sensor which can calculate the motion of the portable device in at least a two dimensional space. As it is already known, such an input device may be used for entering commands and/or characters according to a method comprising the following successive steps, shown on FIG. 1. During a first step $S_1$, several measurements are made by the tilt sensor in reference to a neutral position of said tilt sensor and are used to determine a motion of the portable communication device. In a subsequent step $S_2$, the command and/or character in correspondence with the motion is deduced. It is not an object of the invention to detail herewith the exact software processing which is made at this stage.

As already mentioned above, in known methods, the neutral position which is used as reference for measurements performed by the tilt sensor corresponds to a fixed position calibrated at the time of manufacturing the portable device, and depends on the intrinsic properties of the sensor, and on the way the sensor is positioned inside the device.

According to the invention, the user now has the opportunity to calibrate at any time the neutral position used as reference for the measurements. To this aim, a method according to the invention includes a preliminary calibration step $S_0$ wherein the neutral position is defined as being the current position of the sensor (i.e. of the portable communication device) at the time of entering into said calibration step. This calibration step is triggered by said user, i.e. is performed on the request of said user. This can be done, for instance, by actuation of a key of device 1 (for instance key K shown on FIG. 2). Alternatively, a particular gesture of the user, leading to a particular motion of the portable device, can also be recognized by the tilt sensor and processing means as corresponding to a wish to enter into said calibration step. Triggering of said step may also be done by any other entering means, such as voice recognition.

Assume that the portable communication device is configured such that when a user draws a "3" in the space with the device, the number "3" appears on the screen, and that the original neutral position of the sensor corresponds to the portable device held in a vertical position. With the known method, a user will have to first position the device in the vertical position before drawing a "3" in the space. Thanks to the invention, the user can choose the current position of the sensor as a new neutral position, and perform a gesture which will be recognized even if this new neutral position does not correspond to the originating one. Typically, the user can draw a "3" in the space while lying in bed without having to hold the portable device vertically.

In a preferred embodiment of the method, a further step $S_3$ is provided for displaying on screen 3 of portable device 1 a little target, with a mark or spot N, or any first visual indication the current neutral position, and a mark or spot C, or any second visual indication of any further current position of the device. This will help the user to come back to this neutral position at any time. The center of the target can be defined as the neutral position, while spot C can be easily determined by simply recovering the coordinates delivered by the sensor.

In the example shown in FIG. 2, a two dimensional (2D) accelerometer has been considered. Consequently, visual indications for both current neutral position and current position of the device are made with respect to a two axis coordinate system. In case of a 3D accelerometer, any suitable three dimensional representation could be used in order to help the user to come back to a neutral position.

What is claimed is:

1. A portable communication device comprising:
   a motion detector configured to measure a movement of the device relative to a neutral position of the device;
   an indicating unit configured to provide an indication that a current position of the device is to be set as the neutral position of the device; and
   a control unit configured to:
      set the current position as the neutral position responsive to the indicating unit providing the indication,
      associate the measured movement of the device relative to the neutral position of the device with an associated command, and
      execute the associated command.

2. The portable communication device of claim 1, wherein the indicating unit is a keypad.

3. The portable communication of claim 1, wherein the control unit is further configured to set the current position as the neutral position responsive to the motion detector measuring a predetermined movement of the device relative to the neutral position of the device.

4. The portable communication device of claim 1, further comprising a display, a first indicator representing the neutral position of the device and a second indicator representing any further position of the device.

5. A portable communication device comprising:
   a motion detector configured to measure a movement of the device relative to a neutral position of the device;
   an indicating unit configured to provide an indication that a current position of the device is to be set as the neutral position of the device; and
   a control unit configured to:
      set the current position as the neutral position responsive to the indicating unit providing the indication,
      associate the measured movement of the device with an associated character, and
      enter the associated character as an input character.

6. The portable communication device of claim 5, wherein the indicating unit is a keypad.

7. The portable communication device of claim 5, wherein the control unit is further configured to set the current position as the neutral position responsive to the motion detector measuring a predetermined movement of the device relative to the neutral position of the device.

8. The portable device of claim 5, further comprising a display a first indicator representing the neutral position of the device and a second indicator representing any further position of the device.

* * * * *